(12) United States Patent
Hao et al.

(10) Patent No.: US 7,202,868 B2
(45) Date of Patent: Apr. 10, 2007

(54) SYSTEM AND METHOD FOR VISUAL RECOGNITION OF PATHS AND PATTERNS

(75) Inventors: Ming C. Hao, Palo Alto, CA (US);
Umeshwar Dayal, Saratoga, CA (US);
Fabio Casati, Palo Alto, CA (US);
Daniel A. Keim, Steisslingen (DE);
Eric Stammers, Surrey (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 154 days.

(21) Appl. No.: 10/814,403

(22) Filed: Mar. 31, 2004

(65) Prior Publication Data
US 2005/0219262 A1    Oct. 6, 2005

(51) Int. Cl.
*G06T 11/20* (2006.01)

(52) U.S. Cl. ...................................... 345/440

(58) Field of Classification Search ................ 345/440, 345/440.1, 440.2
See application file for complete search history.

(56) References Cited

U.S. PATENT DOCUMENTS

| | | | |
|---|---|---|---|
| 3,487,308 A * | 12/1969 | Johnson .................. | 324/140 R |
| 5,588,117 A | 12/1996 | Karp et al. | |
| 5,608,904 A | 3/1997 | Chaudhuri et al. | |
| 5,694,591 A | 12/1997 | Du et al. | |
| 5,742,778 A | 4/1998 | Hao et al. | |
| 5,757,356 A * | 5/1998 | Takasaki et al. ............. | 700/276 |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,940,839 A | 8/1999 | Chen et al. | |
| 5,999,193 A * | 12/1999 | Conley et al. ............... | 345/440 |
| 6,052,890 A | 4/2000 | Malagrino, Jr. et al. | |
| 6,115,027 A | 9/2000 | Hao et al. | |
| 6,144,379 A * | 11/2000 | Bertram et al. ............. | 715/835 |
| 6,211,887 B1 * | 4/2001 | Meier et al. ................ | 345/440 |
| 6,314,453 B1 | 11/2001 | Hao et al. | |
| 6,377,287 B1 | 4/2002 | Hao et al. | |
| 6,429,868 B1 * | 8/2002 | Dehner et al. .............. | 345/440 |
| 6,466,946 B1 | 10/2002 | Mishra et al. | |
| 6,502,091 B1 | 12/2002 | Chundi et al. | |
| 6,584,433 B1 | 6/2003 | Zhang et al. | |
| 6,590,577 B1 * | 7/2003 | Yonts ......................... | 345/440 |
| 6,603,477 B1 * | 8/2003 | Tittle ........................... | 345/440 |
| 6,658,358 B2 | 12/2003 | Hao et al. | |
| 6,684,206 B2 | 1/2004 | Chen et al. | |

* cited by examiner

*Primary Examiner*—Mark Zimmerman
*Assistant Examiner*—David Chu

(57) ABSTRACT

The disclosed embodiments relate to a system and method for providing a graphical representation of data. Embodiments of the present invention comprise: abstracting a plurality of parameters from the parameter set, dividing the plurality of parameters into data groups, defining a plurality of partitions for a graphical representation, mapping the data groups to corresponding nodes on the plurality of partitions, and connecting the nodes graphically with indicia that indicates an association between data groups.

23 Claims, 8 Drawing Sheets

SYSTEM AND METHOD FOR VISUAL RECOGNITION OF PATHS AND PATTERNS

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Modem computer databases may store immense amounts of data in databases or the like. This data may hold valuable information that is essentially unusable in its raw form because of the sheer magnitude of the information. However, valuable information may become apparent if the data is properly presented. For example, extraction of such information may be facilitated by presenting the data in a form that allows users to readily observe correlations between data points. Accordingly, many business researchers and data analysts, for example, have long sought to transform large amounts of raw data into valuable business and research intelligence by properly arranging and displaying the data for evaluation. One means of achieving the transformation of raw data into valuable information may include the conversion of the raw numerical data into visual data, which allows users to analyze graphic displays through pattern and trend recognition.

Typically, users construct traditional bar charts, line charts, and flow charts from raw data to provide means for viewing the data in a form conducive to some level of analysis. However, the usefulness of these traditional charts may be limited because of their inability to display large amounts of information in a meaningful format. In many cases, too many graphic features may overwhelm users. Also, users are often unable to perform a proper analysis because of an inability to easily access relevant associated data. For example, the traditional charts mentioned above often force users to navigate through many different charts, reports, and diagrams in order to acquire information needed to make informed decisions. Accordingly, with these traditional charts, users are less able to recognize trends and common patterns, often preventing users from understanding underlying data and observing "cause and effect" paths. Additionally, traditional visualization tools may not assist in identification of key patterns, trends, and relationships and, do not allow users to easily delve deeper into the data.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
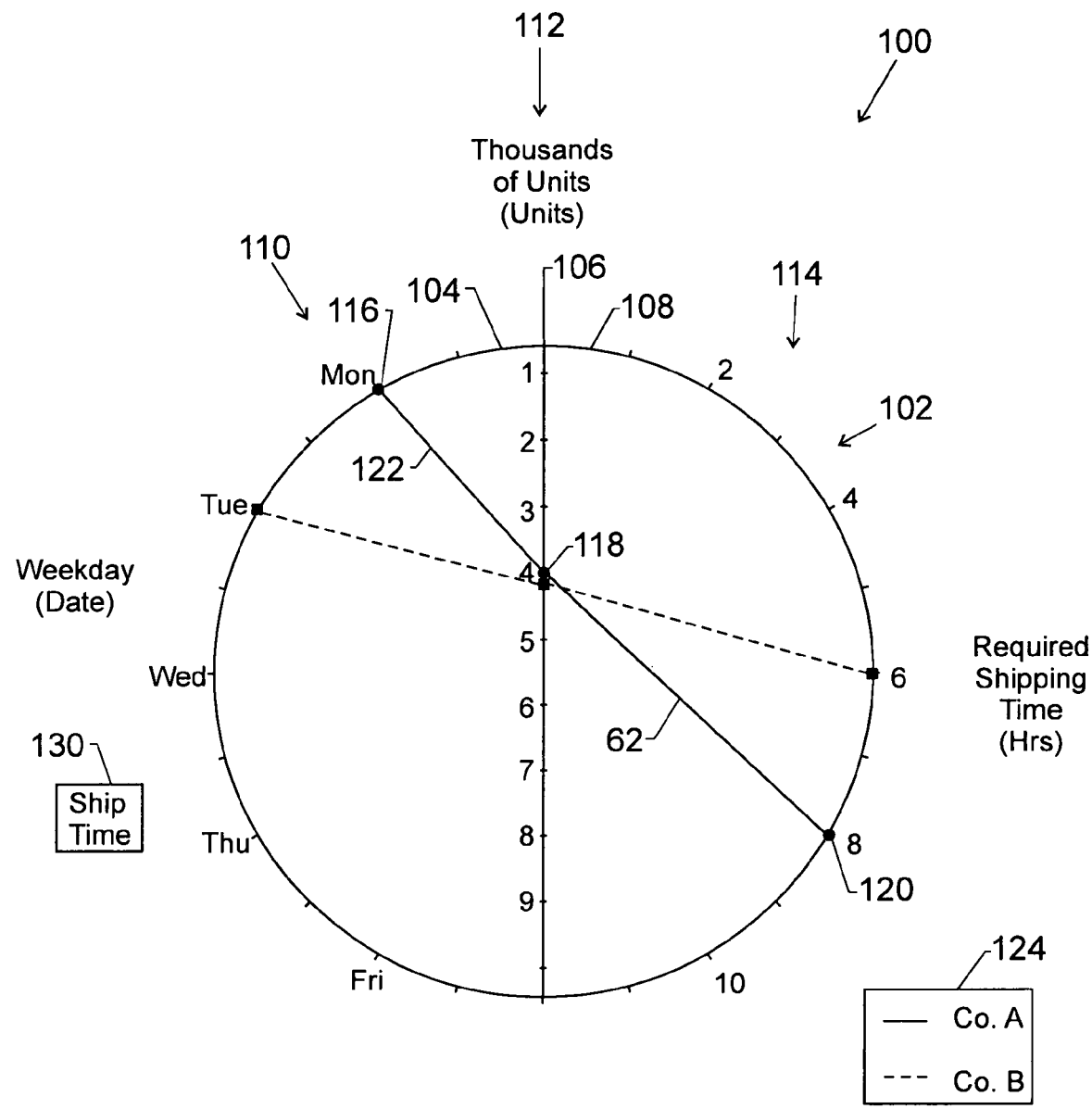
FIG. 1 illustrates a display of a graphic user interface in accordance with embodiments of the present invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention may simplify the study of large dynamics involving multiple parameters. A dynamic may be any interactive system or process such as a complex business operation. In summary, the present invention may simplify the visualization of complex business processes by partitioning the operations into multiple views. Additionally, the present invention may employ piece-wise node and line connections to dynamic construct business impact graphs in real time, use an auto-linking-fading technique for quick identification of key patterns and correlations, and use distinct color and ordering techniques to allow instant identification of exceptions. Particularly, embodiments of the present invention may allow complex business operations and correlations to be simplified and observed by abstracting parameters, deriving multiple graphs to represent a single business case; transforming parameters to nodes, operations and correlations to lines, and measurements to colors to represent operations and relationships; and employing an auto-link-fade mechanism for quick identification of operation paths and for discovering exceptions. For example, in one embodiment, the present invention simplifies complex business operations by abstracting important business parameters and deriving multiple three-parameter circular graphs to represent a single business case. Further, the embodiment may simplify the complex business operations by transforming business parameters into nodes, business operations and correlations to lines, and business measurements to colors to represent operations and relationships. Additionally, one embodiment may employ an auto-link-fade mechanism for quick identification of operation paths and discovering exceptions such that a user can easily navigate through multiple business impact circular graphs to understand the business operation path, to find exceptions, and to understand cause and affect relationships.

For example, certain data may be abstracted from a large data set. Abstraction may comprise selecting certain data and not selecting other data to be included in a graph. Abstraction may be performed by users familiar with the data set or based on algorithms specifically developed for the data set. Further, the graph including the abstracted data may be divided into three partitions, left, center and right. Nodes along the left partition may be designated as source nodes; nodes along the center partition may be designated as intermediate nodes; and nodes along the right partition may be designated as destination nodes. Nodes may be graphic data points that represent points in a dynamic. A node may be drawn for each distinct value of a graphic feature. For example a node may represent a computer, a type of request, or a time of day. A row and column hash set may be constructed, one column for each graphic feature or attribute and one row for each input line. Further, a node may be drawn for each distinct value of the attribute. Each node hash map may contain a set of rows. In the same way, the line hash map may store the row numbers that have both endpoint nodes in common. Accordingly, piece-wise node and line information may be stored in a set of node hash maps and line hash maps.

Further, like the nodes, lines and positioning discussed above; color and animation may also represent certain business metrics. For example, coloring of certain graphic features may represent such data as response time, violation level, or dollar amount. Additionally, animation or time may allow for observation of changes over time or over some other changing value.

FIG. 1 illustrates a display 100 of a graphic user interface in accordance with embodiments of the present invention. The display 100 comprises a graph 102 having multiple partitions. While other embodiments can be envisaged which incorporate more partitions, the illustrated embodiment merely shows first 104, second 106, and third 108 partitions. The illustrated graph 102 is generally circular, but other embodiments can be envisaged wherein the graph is shaped differently. In one embodiment, the display 100 may be used to determine which of a plurality of shipping companies is the more efficient than others. For example, in FIG. 1, a more efficient company is illustrated as having a shorter duration time. Accordingly, in the illustrated embodiment, the first 104, second 106, and third 108 partitions display three parameter sets 110, 112, 114, which are respectively titled "Weekday (date)," "Thousands of Units (units)," and "Required Shipping Time (hrs)." In the illustrated embodiment, these parameters may be used to determine whether Company A or Company B is more efficient. While the illustrated embodiment is a simple example, those skilled in the art can appreciate that multiple companies or other variables may be incorporated. Additionally, it should be noted that while the illustrated embodiment shows ship times in order to discern the more efficient shipping company, those skilled in the art can appreciate that other variables may be illustrated for other practical uses.

As discussed previously, nodes along the first 104, second 106, and third 108 partitions may be referred to respectively as source nodes, intermediate nodes, and destination nodes. Source node 116, intermediate node 118, and destination node 120 represent specific parameters along each partition. For example, in the illustrated embodiment, node 116, along with the other source nodes, represents a day of the week; node 118, along with other intermediate nodes, represents a number of units shipped; and node 120, along with other destination nodes, represents a required time to ship. A line 122 connects nodes 116, 118, and 120. The line 122 may be color coded or texture coded to represent a certain parameter or simply to distinguish the line from other lines represented on the graph. Accordingly, a user, by observing the graph 102, may ascertain that on Monday a shipment of 4,000 units required 8 hours and that on Tuesday a similar shipment of approximately 4,000 units required 6 hours. Further, if color or texture is used to designate a certain delivery company, as texture is used in FIG. 1, a user may determine that Delivery Company A processed the Monday shipment, while Delivery Company B processed the Tuesday shipment based on the coding. A legend 124 may clarify such a designation, as is illustrated in FIG. 1.

Figure 2:
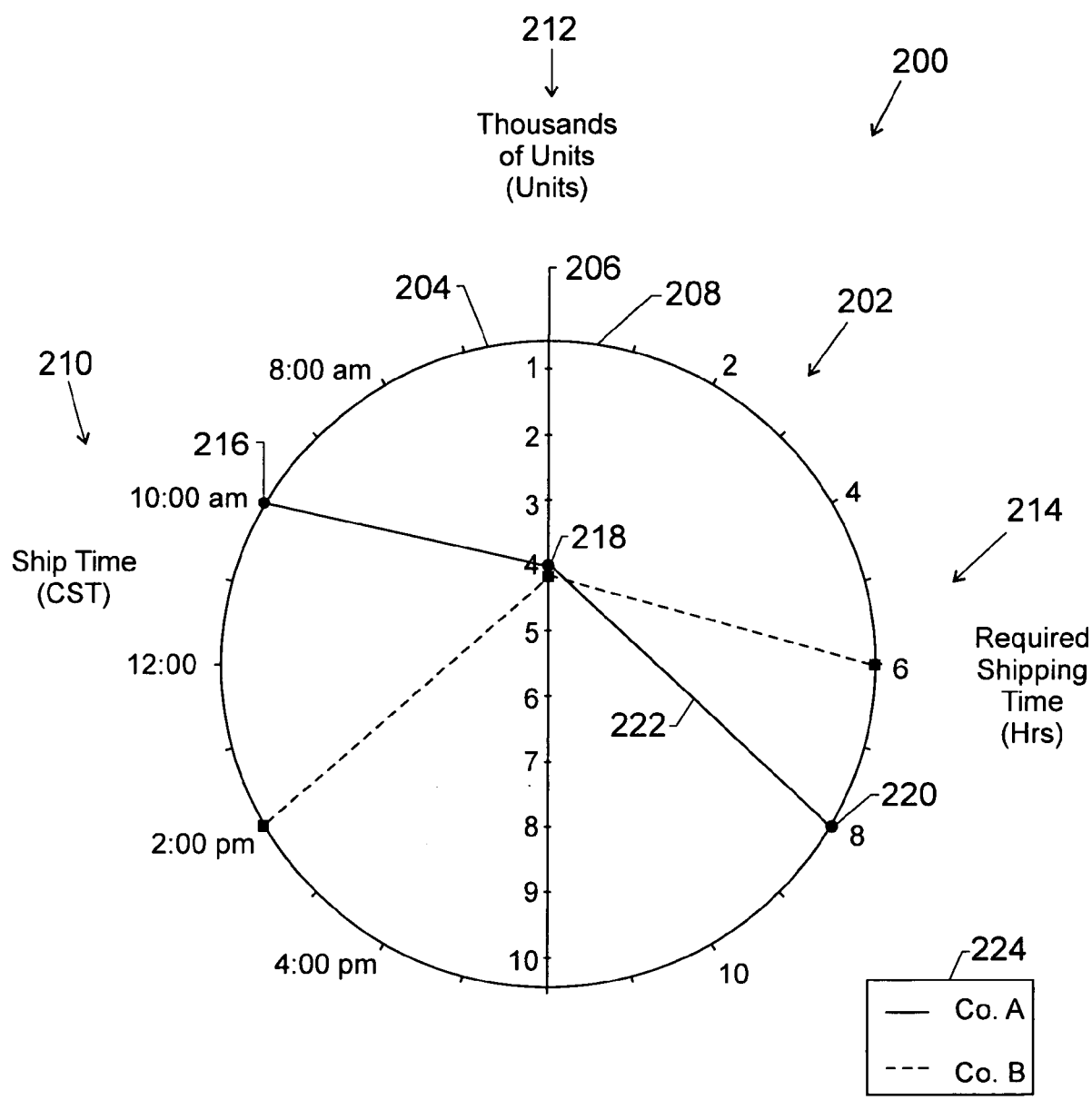
FIG. 2 illustrates a display of a graphic user interface in accordance with embodiments of the present invention.

FIG. 2 illustrates a display 200 of a graphic user interface in accordance with embodiments of the present invention. Specifically, FIG. 2 represents a display 200 that a user may directly access through a link between display 100 and display 200. An auto-link-fade mechanism may be a module that provides means for selection and decomposition of visualized business parameters. Accordingly, as previously discussed, users may easily navigate through multiple dynamic graphs to understand operation paths, to find exceptions, and to understand cause and affect relationships. For example, if a user is interested in ship time activity, the user could utilize one embodiment of the auto-link-fade mechanism to select a graphical link 130 on the graph 102 (FIG. 1), which is associated with the date parameter and, which would provide access to display 200 and ship time as shown in FIG. 2. Further, in one embodiment, the auto-link-fade mechanism may be used to select a particular line type (e.g. a particular color or texture) such that only lines of the selected type are visible.

The display 200 comprises a graph 202 having multiple partitions. The illustrated graph 202 is generally circular, but other embodiments can be envisaged wherein the graph is shaped differently. While other embodiments can be envisaged which incorporate more partitions, the illustrated embodiment merely shows first 204, second 206, and third 208 partitions. The first 204, second 206, and third 208 partitions display three parameter sets 210, 212, 214, which are respectively titled "Ship Time (CST)," "Thousands of Units (units)," and "Required Shipping Time (hrs)." Nodes 216, 218, 220 represent specific parameters along each partition. For example, in the illustrated embodiment, node 216, along with the other source nodes, represents time of day; node 218, along with other intermediate nodes, represents a number of units shipped; and node 220, along with other destination nodes, represents a required time to ship. A line 222 connects nodes 216, 218, and 220. The line 222 may be color coded or texture coded to represent a certain parameter or simply to distinguish the line from other lines represented on the graph. Accordingly, by observing the graphs 102 and 202, a user may ascertain that on Monday at 10:00 AM Company A shipped 4,000 units requiring 8 hours, and that at 2:00 PM Company B made a similar shipment of approximately 4,000 units requiring 6 hours. Further, if color or texture is used to designate a certain delivery company, a user may determine that Delivery Company A processed the 10:00 AM shipment, while Delivery Company B processed the 2:00 PM shipment based on the coding. Such a designation may be clarified using a legend 224, as illustrated in FIG. 2.

Figure 3:
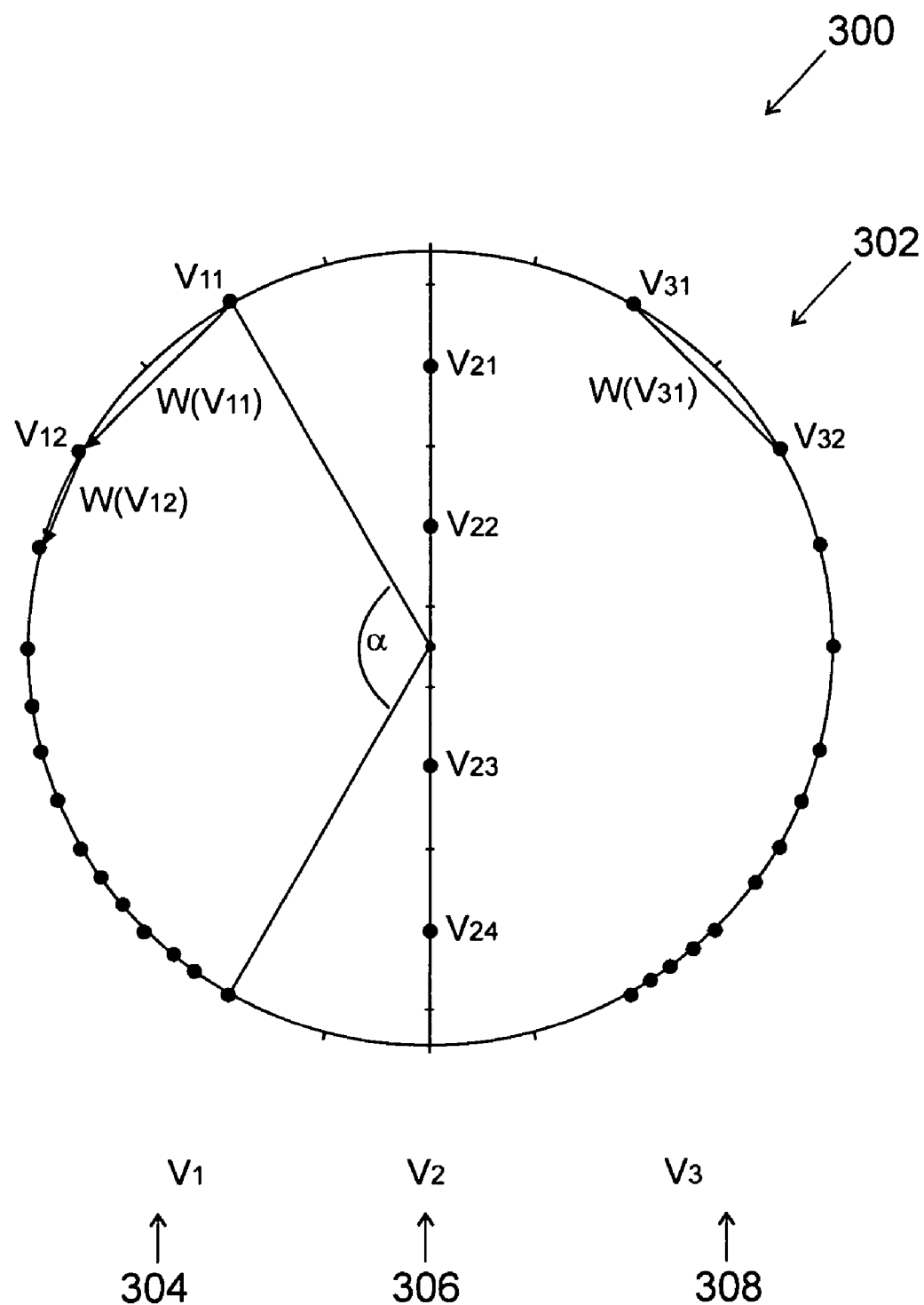
FIG. 3 illustrates a display of a graphic user interface in accordance with embodiments of the present invention.

FIG. 3 illustrates a display 300 of a graphic user interface in accordance with embodiments of the present invention. Particularly, FIG. 3 demonstrates that nodes may be ordered by measurements, allowing users to visually determine relative value or to more easily distinguish details of important data. For example, display 300 comprises a circular graph 302 that is divided into three partitions 304, 306, 308 (V1, V2, V3), and that has ordered nodes in accordance with one embodiment of the present invention. Further, in the illustrated embodiment, (FIG. 3) the nodes are laid out based on a weight function. Such a weight function may give important nodes more space on the screen while less important nodes get less space. In the circular shaped graph 302, this weight function may be based on a weighted computation of the radian. For example, as illustrated by FIG. 3, the weight $W_i$ of a node $v_i \epsilon V_1$, $i \epsilon \{1 \ldots N\}$, depends on a fourth attribute A. Moreover, the weight $W_i$ may be defined by the ratio of $v_i$'s attribute, $a_i \epsilon A$ and the sum of all the attributes $$a \in A, |A| = N: W_i = \frac{a_i}{\sum_{j=1}^{N} a_j}.$$

In a different embodiment, nodes may be ordered vertically by a value from top (e.g. smallest value) to bottom (e.g. greatest value) on a graph that is square, circular or otherwise. Other embodiments can be envisaged wherein nodes are ordered based on their alphanumeric value. Still, other embodiments can be envisaged which lay out nodes in a logical order, horizontally.

Figure 4:
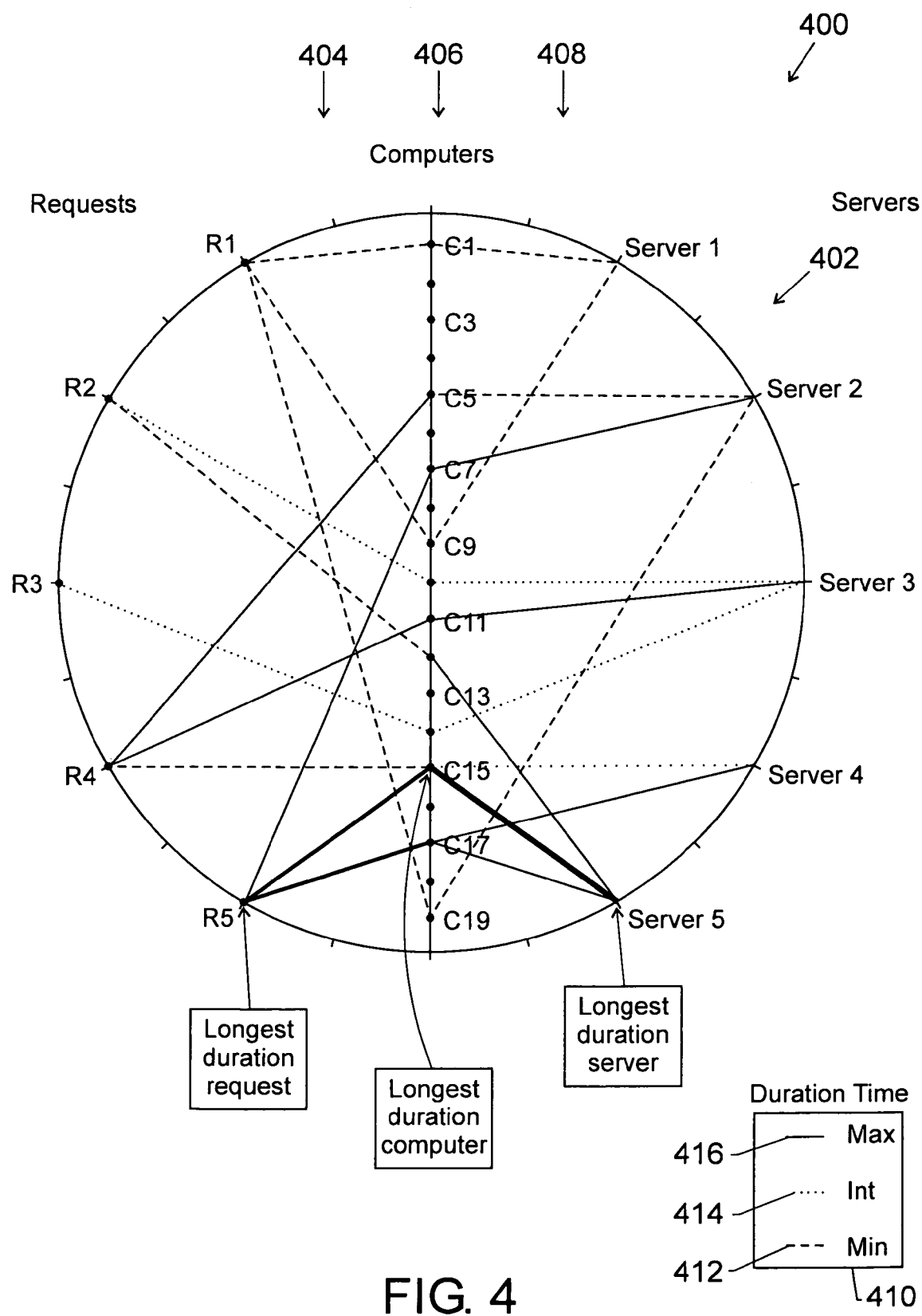
FIG. 4 illustrates a display of a graphic user interface in accordance with embodiments of the present invention.

FIG. 4 illustrates a display 400 of a graphic user interface in accordance with embodiments of the present invention. Specifically, FIG. 4 illustrates a further example of certain aspects of the claimed visualization technique wherein the technique is applied to explore business process duration time in a server utilization scenario. The display 400 may be utilized to find out which of a plurality of resources has the longest duration time in order to optimize a network. For example, a resource may be a server and a bottleneck server may be identified using one embodiment of the present invention. Further, with the information gained, a second server may be added to balance the work load. Accordingly, graph 402 illustrates a large set of business instances. While the graph 402 illustrates a certain number of instances, it is merely one embodiment and other embodiments can be envisaged that illustrate more or fewer instances. In this example, three parameters (Requests, Computers, and Servers) have been abstracted or removed from a data set. The Graph 402 shows "Requests" nodes as source nodes residing on a first partition 404, "Computers" nodes as intermediate nodes residing on a second partition 406, and "Servers" nodes as destination nodes residing on a third partition 408. The source nodes have five distinct values R1–R5; the intermediate nodes have nineteen distinct values C1–C19; and the destination nodes have five values, which are server names Server1–Server5.

The graph 402 also comprises lines, which represent connections between the nodes. The lines are texture coded based on the legend 410, in this embodiment, to represent a measurement of duration time. Specifically, in the embodiment illustrated by FIG. 4, dashed lines 412 represent the shortest duration time, dotted lines 414 represent the intermediate duration time, and solid lines 416 represent the maximum duration time. Other embodiments can be envisaged wherein the lines are color coded to represent the measurement of duration time. For example, red could represent a long duration, burgundy could represent an intermediate duration, and green could represent a short duration. Additionally, it should be noted that the lines and line attributes (e.g. texturing, thickness or coloring) may represent other information. For example, a line thickness may correspond to a number of lines belonging to the same category. In other words, the line thickness may represent multiple instances of a type of occurrence such that the thicker the line, the more occurrences have taken place. The line from R5 to C15 in FIG. 4 is illustrative of this use of line thickness in that it represents two R5 requests utilizing the C15 computer and it is twice as thick as a line representing a single utilization. Further, it should be noted that the server names are ordered based on the average duration time from "Server 1" (shortest average duration time) to "Server 5" (longest average duration time).

Figure 5:
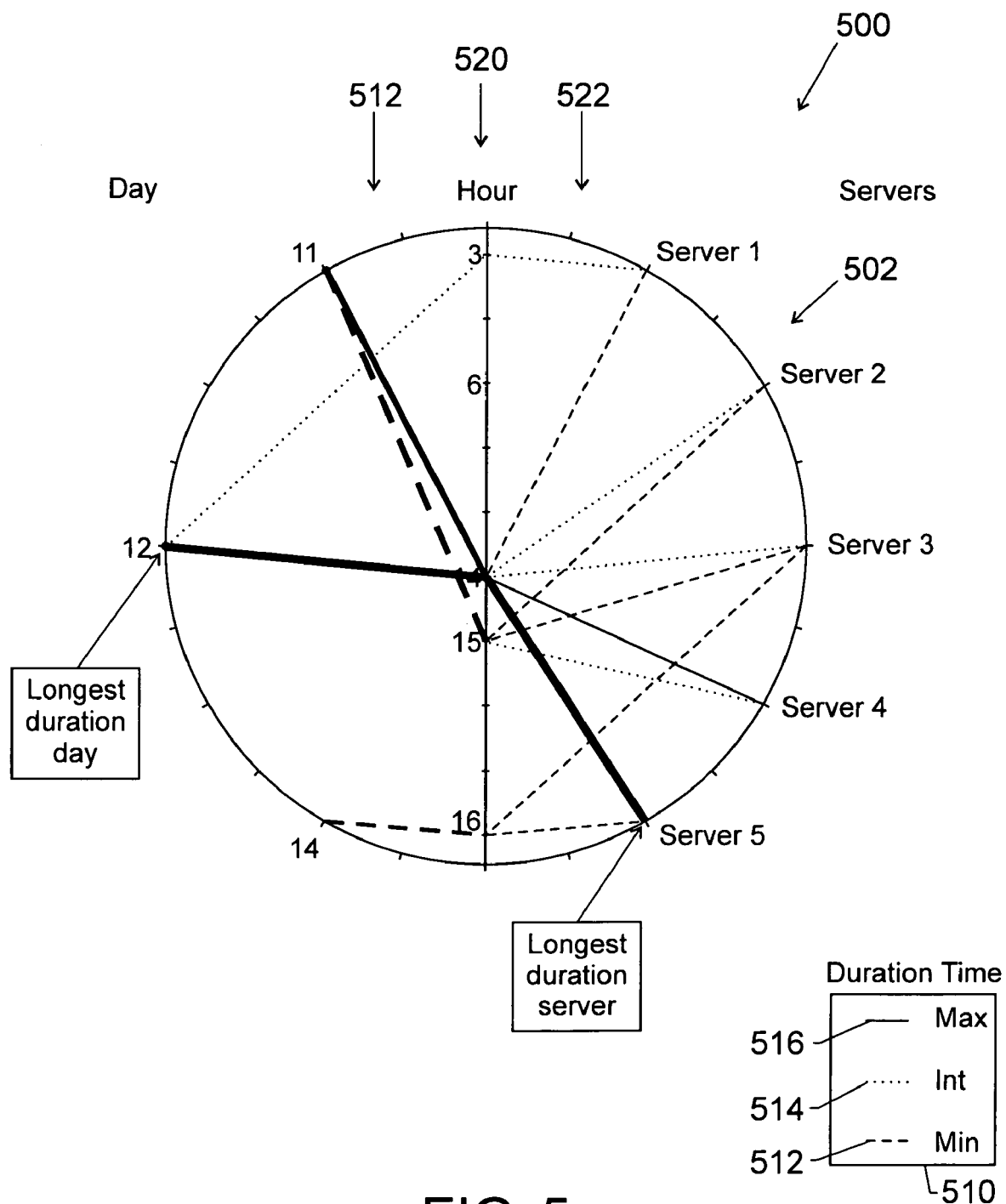
FIG. 5 and 6 illustrate displays of a graphic user interface in accordance with embodiments of the present invention.
Figure 6:
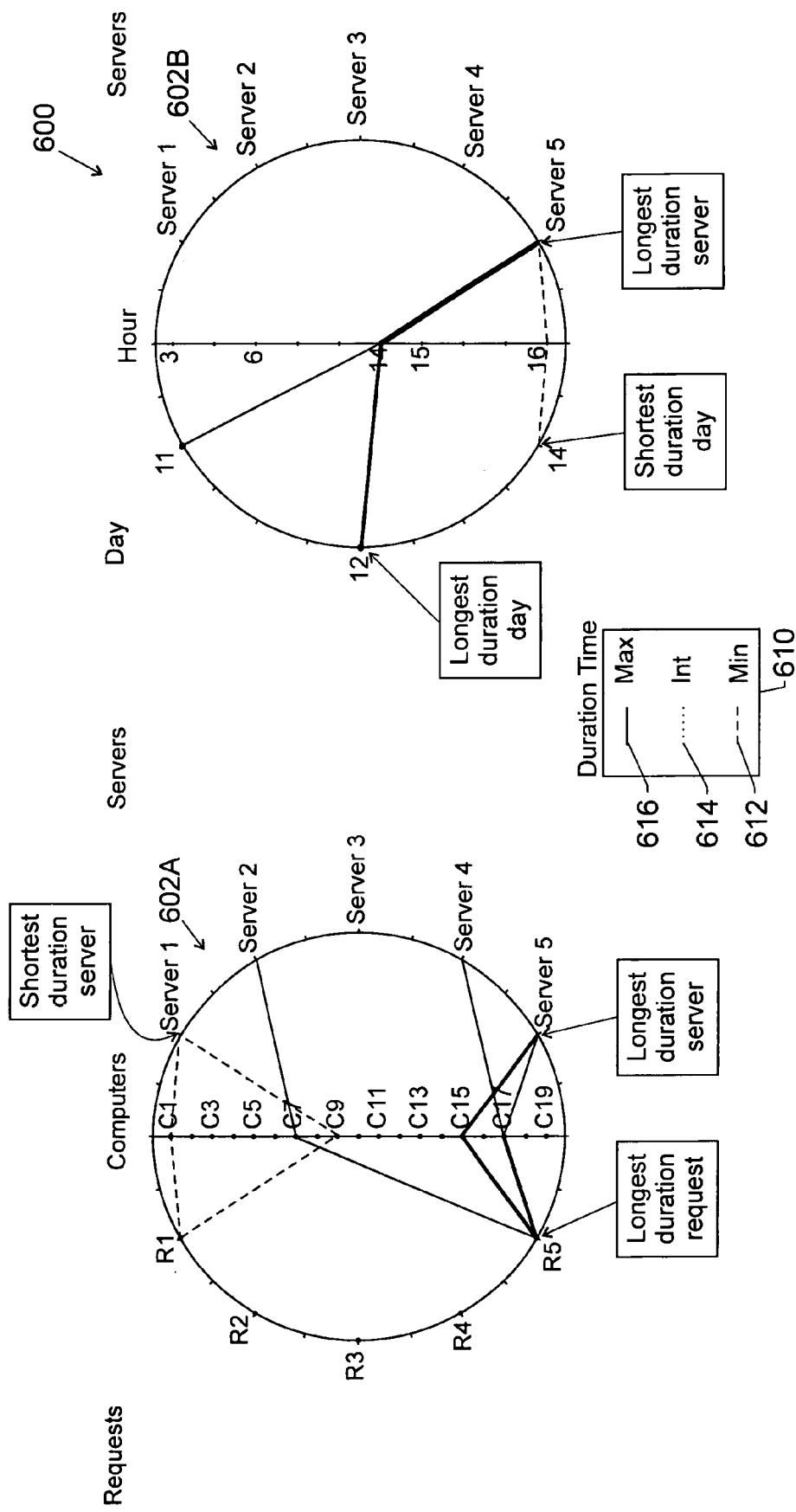

FIGS. 5 and 6 illustrate displays 500, 600 of a graphic user interface in accordance with embodiments of the present invention. Specifically, FIGS. 4, 5 and 6 may be used to illustrate linking across multiple graphs. For example, graph 402 (FIG. 4) may link to graph 502 (FIG. 5), graph 602A (FIG. 6), and graph 602B (FIG. 6) using "Servers" as common nodes. In one example, a user may select "Server" to analyze resource utilization over time as illustrated by graph 502. In another example, a user may select "Requests node" R5 to analyze R5 resource utilization because it shows the longest average duration time. Accordingly, the embodiments illustrated by FIGS. 5 and 6 may be further utilized to analyze resource utilization as discussed regarding FIG. 4.

As discussed regarding the graph 102, each of the graphs 402, 502, 602A, and 602B also comprise lines, which represent connections between the nodes. The lines are texture coded based on the respective legends 410, 510 and 610 to represent a measurement of duration time. Again, dashed lines 412, 512, 612 represent the lowest value, dotted lines 414, 514, 614 represent the intermediate value, and solid lines 416, 516, 616 represent the maximum value. Also, it should again be noted that the server names are ordered based on the average duration time from "Server 1" (shortest average duration time) to "Server 5" (longest average duration time).

In the illustrated embodiment, the graph 502 shows "Day" nodes as source nodes residing on a first partition 512, "Hour" nodes as intermediate nodes residing on a second partition 520, and "Servers" nodes as destination nodes residing on a third partition 522. The source nodes have three distinct values "11", "12", and "14"; the intermediate nodes have five distinct values "3", "6", "14", "15", and "16"; and the destination nodes have five values, which are server names Server1–Server5. Based on these nodes, the lines connecting them, and the legend, as discussed above, graph 502 illustrates that Day 12 has the longest duration (solid line), Day 14 has the shortest duration (dashed line), Hour 14 has the longest duration (solid lines), Hour 16 has the shortest duration (dashed lines), and Server 5 is the longest duration server (bottom of the circle).

FIG. 4, 5 and 6 also demonstrate further aspects of the present technique. These aspects may comprise grouping and linking multiple attributes together in a piece-wise format in any order. For example, as discussed previously, a user may select a node or a line to show all data entries for that node or line in the input data set. Additionally, all other nodes and lines may be faded out. Displays 500 and 600 actually illustrate how utilizing link and fade capabilities may allow a user to quickly identify further information, and diagnose problem areas. For example, a user may select request nodes on graph 402 to analyze the selected nodes' server utilization through connected "Computers," "Servers," "Day," and "Hour" as displayed in FIG. 6. Then, a user could distinguish detail about the data specifically related to R5 based on observation of graph 602A. Further, an observer could distinguish details about data concerning R5 in relation to Day and Hour nodes based on observation of graph 602B.

Figure 7:
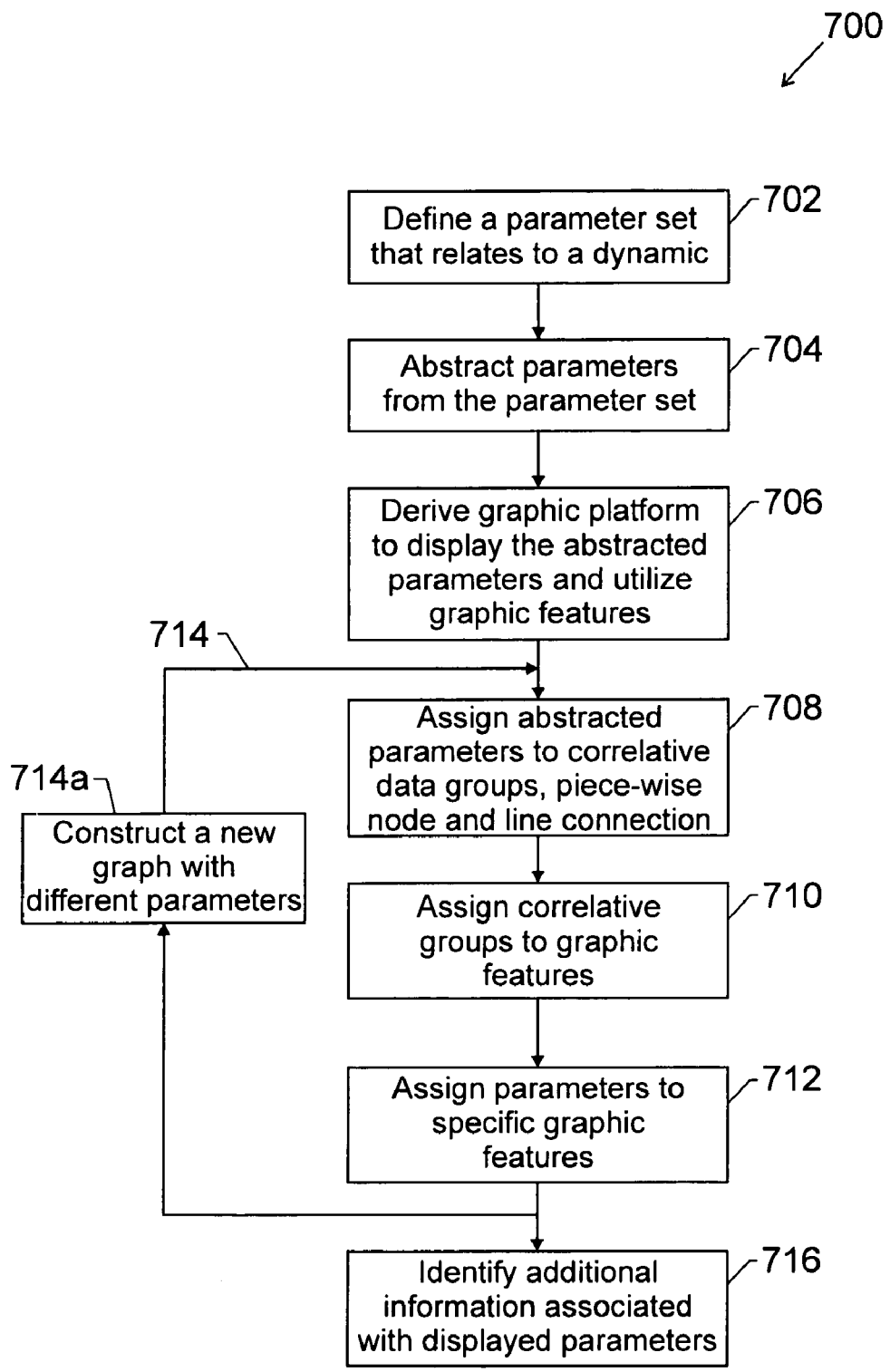
FIG. 7 is a process flow diagram showing a method for presenting data in a graphic form in accordance with embodiments of the present invention.

FIG. 7 is a process flow diagram showing a method for presenting data in a graphic form in accordance with embodiments of the present invention. The process is generally referred to by the reference numeral 702. FIG. 1 represents a visualization technique that simplifies the visualization of complex dynamics involving large numbers of parameters and/or large amounts of data. This visualization technique may, among other benefits, allow more ready utilization of human pattern recognition to evaluate data. The visualization technique may provide this enhanced evaluation ability through some or all of the acts illustrated by blocks 704–716 of FIG. 7, which may or may not be performed in the designated order.

Specifically, in the embodiment illustrated by FIG. 7, the visualization technique comprises defining a parameter set that relates to a dynamic and abstracting parameters from the dynamic, as shown in blocks 702 and 704 respectively. Abstracting parameters may comprise selecting certain related data or parameters from a large data set. The selected parameters or data may be deemed valuable for interpreting aspects of a particular dynamic. As discussed previously, a dynamic may be any interactive system or process. For example, a dynamic may be a business, a database, or a scientific experiment. Users, based on their knowledge and on the established requirements of a particular dynamic, may perform this abstraction.

Block 706 of FIG. 7 illustrates the act of deriving a graphic platform to display the abstracted parameters. This graphic platform may be divided into partitions and may utilize various graphic features to represent abstracted parameters. For example, the graphic features may comprise variable nodes, lines, colors, line thickness, textures, relative ordering, relative distance, and/or time/animation. As more fully described previously, these techniques may be used to make patterns in data more recognizable. For example, in one embodiment, multiple attributes are grouped and linked together in a piece-wise format in any order and a user can click on a node or a line to show all data entries for that node or line in an input data set while all other nodes and lines are faded out.

Block 708 of FIG. 7 represents the act of assigning each of the abstracted parameters to correlative data groups. The group assignment may be based on a plurality of factors including: the relationship of the parameters to one another, the relationship of the parameters to other data, the value of comparing the parameters, or any other aspect defining or related to the parameters. For example, parameters may be grouped together because each parameter is a certain type of data (e.g. requests sent via computer) or each parameter may be grouped together because a user determines that comparison of the parameters would be valuable. Block 710 represents the act of assigning each correlative group to a graphic feature type. For example, one type of data may be a date, which may be assigned to a "Date" group and, the "Date" group parameters may be assigned to a color or to animation. Block 710 may comprise constructing a row and column hash set having one column for each attribute and one row for each input line, drawing a node for each distinct value of an attribute, and storing the piece-wise node and line information in a set of node hash maps and line hash maps. In block 712, the parameters are specifically assigned to particular graphic features such as coloring, ordering and weighted spacing. For example, in the embodiment used as an illustration in FIG. 6, if color is used to represent the values associated with the duration lines, solid lines could be red, dashed lines could be yellow, and dotted lines could be blue. Further, any color scheme may be used. For example, shades may be used going from lighter to darker to represent graduated variables such as longer and shorter duration times. In another example, if animation is used, features on the graph may change position or color as the animation proceeds from Day 11 to Day 12 and then to Day 14. Further, as illustrated by block 716, the visualization technique may comprise start, stop and replay animation features or real-time animation.

The process may be repeated multiple times for different parameters as illustrated by line 714 and block 714A. Accordingly, multiple graphs may be developed to represent a single dynamic case. Further, it should be noted that other embodiments can be envisaged wherein different types of data are used with different illustrative features, including the use of the same illustrative features for multiple different types of data.

As illustrated in block 716 of FIG. 7, the visualization technique may facilitate recognition of correlations, paths and patterns or the identification of additional information associated with displayed parameters such as by employing a linking and fading mechanism. This act, may allow users to quickly recognize areas of data that are of interest or concern. For example, in one embodiment, graphic features such as nodes and lines, which represent data, may be linked to other graphics or data lists associated with the data. In one embodiment, a user can select a node or line to show all data entries for that node or line in the input data set, while all other nodes and lines may be shown as faded out. In another embodiment, identifying additional information may comprise the mere act of reducing the amount of graphic features to enable more ready identification of pertinent data. Further, in another embodiment, a graphic feature may link upon selection to a data list comprising the data represented by the graphic feature and vice versa.

Figure 8:
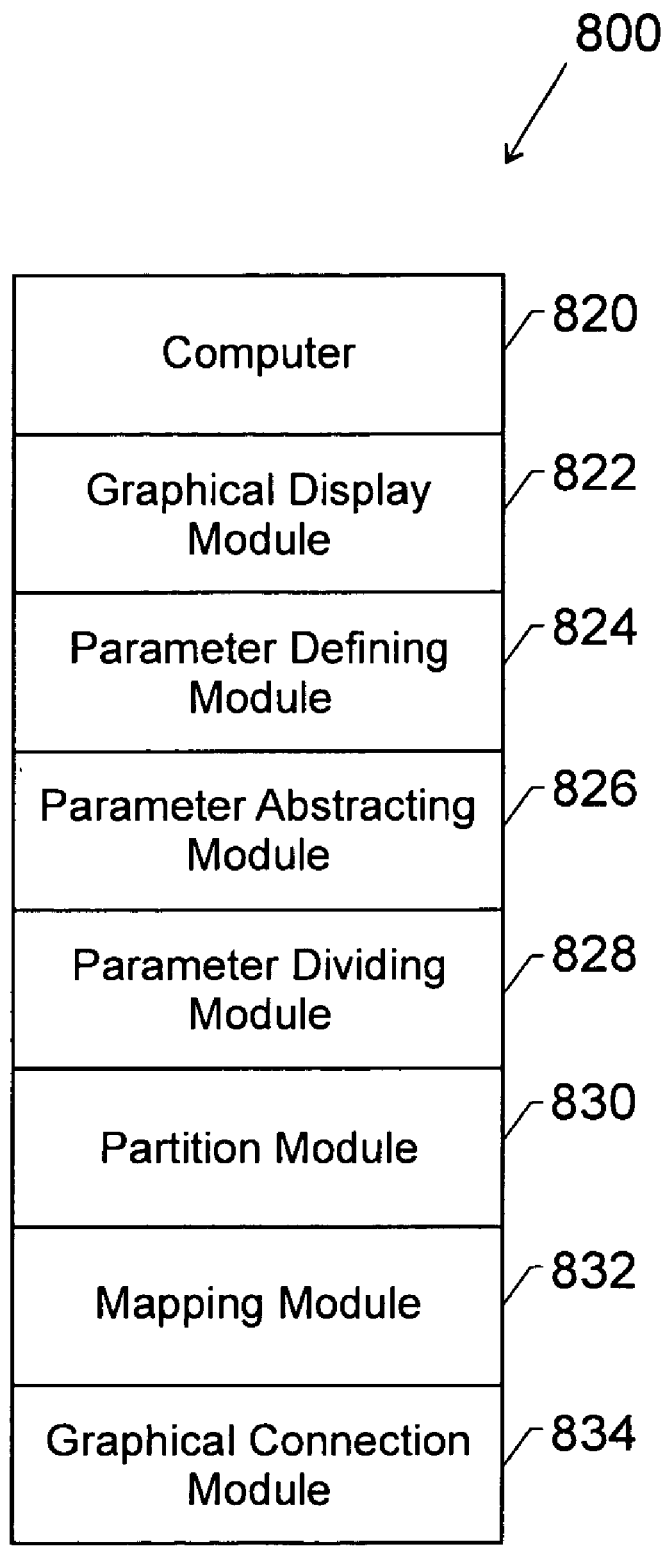
FIG. 8 is a block diagram of a computer system in accordance with one embodiment of the present invention.

FIG. 8 is a block diagram of a computer system 800 in accordance with one embodiment of the present invention. Specifically, block 820 of FIG. 8 represents a computer. The computer (block 820) may comprise or interact with modules represented by blocks 822–834, thus allowing for application of the method presented in FIG. 7. The modules (blocks 822–834) may be hardware, software or some combination of hardware and software. Additionally, an individual module may not necessarily solely comprise each module function as illustrated. In other words, the modules shown in blocks 822–834 are merely one example and other embodiments can be envisaged wherein the functions are split up differently or wherein some modules are not included and other modules are included. The illustrated modules (blocks 822–834) comprise: a graphical display module (block 822), a parameter defining module (block 824), a parameter abstracting module that abstracts a plurality of parameters from a parameter set that relates to a dynamic (block 826), a parameter group dividing module that divides the plurality of parameters into data groups (block 828), a partition defining module that defines a plurality of partitions for a graphical representation (block 830), a mapping module that maps the data groups to corresponding nodes on the plurality of partitions (block 832), and a graphical connection module that connects the nodes graphically with indicia that indicates an association between the data groups (block 834). In this embodiment and in other envisaged computer system embodiments, a user may incorporate the functionality of a computer to enhance the performance of the visualization technique discussed previously. For example, the computer (block 820) may convert defined parameters into graphical displays such as those illustrated by FIGS. 1–6 by utilizing the modules represented by blocks 822–834.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for providing a graphical representation of data, the method comprising:
   determining a plurality of parameters from a parameter set that relates to a dynamic;
   dividing the plurality of parameters into data groups based on characteristics of the parameters;
   defining a plurality of partitions of a figure for graphical representation of the data groups, the plurality of partitions comprising:
      a first partition comprising a first portion of the perimeter of the figure;
      a second partition comprising a line dividing the figure; and
      a third partition comprising a second portion of the perimeter of the figure that is different from the first portion;
   mapping parameters of the data groups to corresponding nodes at locations on the partitions corresponding to each data group based on parameter values and values associated with the locations on the partitions; and
   connecting the nodes graphically with indicia that indicates an association between data groups;
   and displaying or printing the graphical representation.

2. The method of claim 1, comprising:
   mapping parameters of a first data group to nodes on the first partition;
   mapping parameters of a second data group to nodes on the second partition; and
   mapping parameters of a third data group to nodes on the third partition.

3. The method of claim 1, comprising ordering the nodes according to associated parameter values.

4. The method of claim 1, comprising spacing the nodes according to associated parameter values.

5. The method of claim 4, comprising providing more space for nodes with higher associated parameter values.

6. The method of claim 4, comprising connecting nodes and lines in a piece-wise fashion.

7. The method of claim 1, comprising assigning a weight to the nodes and ordering the nodes according to the weight.

8. The method of claim 1, comprising assigning a weight to the nodes and spacing the nodes according to the weight.

9. The method of claim 8, comprising providing more space for nodes with high weight.

10. The method of claim 1, wherein the graphical representation comprises real time animation.

11. The method of claim 1, comprising auto-linking the indicia.

12. The method of claim 1, comprising auto-linking the nodes.

13. The method of claim 1, comprising fading the indicia.

14. A computer system for providing a graphical representation of data, the computer system comprising:
    a parameter abstracting module that abstracts a plurality of parameters from a parameter set that relates to a dynamic;
    a parameter group dividing module that divides the plurality of parameters into data groups based on parameter characteristics;
    a partition defining module that defines a plurality of partitions of a figure for graphical representation of the data groups, the plurality of partitions comprising:
       a first partition comprising a first portion of the perimeter of the figure;
       a second partition comprising a line dividing the figure; and
       a third partition comprising a second portion of the perimeter of the figure that is different from the first portion;
    a mapping module that maps parameters of the data groups to corresponding nodes at locations on the partitions corresponding to each data group based on parameter values and values associated with the locations on the partitions; and
    a graphical connection module that connects the nodes graphically with indicia that indicates an association between the data groups.

15. The computer system of claim 14, comprising a node ordering module that graphically orders the nodes based on relative parameter values associated with the nodes.

16. The computer system of claim 14, comprising a node weight assigning module that assigns weight values to the nodes.

17. The computer system of claim 14, comprising a node spacing module that graphically spaces the nodes.

18. The computer system of claim 14, comprising a real time animation module that provides real time animation of the plurality of parameters.

19. The computer system of claim 15, comprising an auto-link module that provides auto-linking of the indicia.

20. A computer system for providing a graphical representation of data, the computer system comprising:
    means for abstracting a plurality of parameters from a parameter set that relates to a dynamic;
    means for dividing the plurality of parameters into data groups based on parameter characteristics;
    means for defining a plurality of partitions of a figure for graphical representation of the data groups, the plurality of partitions comprising:
       a first partition comprising a first portion of the perimeter of the figures;
       a second partition including a line dividing the figure; and
       a third partition comprising a second portion of the perimeter of the figure that is different from the first portion;
    means for mapping parameters of the data groups to corresponding nodes at locations on the partitions corresponding to each data group based on parameter values and values associated with the locations on the partitions; and
    means for connecting the nodes graphically with indicia that indicates an association between data groups.

21. The computer system of claim 20, comprising a means for assigning node weight.

22. The computer system of claim 20, comprising a means for graphically spacing the nodes.

23. A computer with readable tangible medium having stored thereon a computer program, the computer program comprising:
    a parameter abstracting module stored on the tangible medium, the parameter abstracting module being adapted to abstract a plurality of parameters from a parameter set that relates to a dynamic;
    a parameter group dividing module stored on the tangible medium, the parameter abstracting module being adapted to divide the plurality of parameters into data groups based on parameter characteristics;

a partition defining module stored on the tangible medium, the parameter abstracting module being adapted to define a plurality of partitions of a figure for graphical representation of the data groups, the plurality of partitions comprising:

a first partition including a first portion of the perimeter of the figure;

a second partition including a line dividing the figure; and a third partition including a second portion of the perimeter of the figure that is different from the first portion;

a mapping module stored on the tangible medium, the mapping module being adapted to map parameters of the data groups to corresponding nodes at locations on the partitions corresponding to each data group based on parameter values and values associated with the locations on the partitions; and a graphical connection module stored on the tangible medium, the graphical connection module being adapted to connect the nodes graphically with indicia that indicates an association between the data groups.

* * * * *

UNITED STATES PATENT AND TRADEMARK OFFICE
CERTIFICATE OF CORRECTION

PATENT NO. : 7,202,868 B2  Page 1 of 1
APPLICATION NO. : 10/814403
DATED : April 10, 2007
INVENTOR(S) : Ming C. Hao et al.

It is certified that error appears in the above-identified patent and that said Letters Patent is hereby corrected as shown below:

In column 1, line 15, delete "Modem" and insert -- Modern --, therefor.

In column 10, line 59, in Claim 23, after "computer" delete "with".

Signed and Sealed this

Twenty-eighth Day of April, 2009

JOHN DOLL
*Acting Director of the United States Patent and Trademark Office*